(12) United States Patent
Wang et al.

(10) Patent No.: US 12,326,573 B2
(45) Date of Patent: Jun. 10, 2025

(54) OPTICAL SYSTEM INCLUDING PANCAKE LENS ASSEMBLY

(71) Applicant: NATIONAL YANG MING CHIAO TUNG UNIVERSITY, Hsinchu (TW)

(72) Inventors: Yu-Jen Wang, Taipei (TW); Yi-Hsin Lin, Zhubei (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 550 days.

(21) Appl. No.: 17/668,141

(22) Filed: Feb. 9, 2022

(65) Prior Publication Data
US 2023/0004015 A1 Jan. 5, 2023

(30) Foreign Application Priority Data

Jun. 30, 2021 (TW) ................... 110124063

(51) Int. Cl.
*G02B 27/28* (2006.01)
*G02B 5/30* (2006.01)

(52) U.S. Cl.
CPC ......... *G02B 27/286* (2013.01); *G02B 5/3016* (2013.01); *G02B 5/3025* (2013.01)

(58) Field of Classification Search
CPC .. G02B 27/286; G02B 5/3016; G02B 5/3025; G02B 27/283; G02B 2027/0123; G02B 27/0172; G02B 2207/117
See application file for complete search history.

(56) References Cited

U.S. PATENT DOCUMENTS

| | | | |
|---|---|---|---|
| 6,661,495 B1 | 12/2003 | Popovich | |
| 2020/0049872 A1* | 2/2020 | Peng | ............. G02B 27/283 |
| 2020/0089017 A1 | 3/2020 | Wu et al. | |
| 2020/0096817 A1* | 3/2020 | Richards | ............. G02B 27/32 |
| 2021/0286124 A1* | 9/2021 | Peng | ............. G02F 1/133536 |

FOREIGN PATENT DOCUMENTS

| | | |
|---|---|---|
| CN | 112470058 A | 3/2021 |
| TW | I356182 B | 1/2012 |
| TW | I668471 B | 8/2019 |

OTHER PUBLICATIONS

Y. Li et al., "Broadband cholesteric liquid crystal lens for chromatic aberration correction in catadioptric virtual reality optics," Optics Express, 29(4), pp. 6011-6020, 2021.
(Continued)

*Primary Examiner* — Thomas K Pham
*Assistant Examiner* — Jennifer A Jones
(74) *Attorney, Agent, or Firm* — Brooks Kushman P.C.

(57) ABSTRACT

An optical system includes a pancake lens assembly which has a lens unit and a liquid crystal device. The lens unit includes a partially reflective mirror, a reflective polarizer, and a quarter waveplate disposed between the partially reflective mirror and the reflective polarizer. The liquid crystal device is disposed between the quarter waveplate and the reflective polarizer. When a light is introduced into the pancake lens assembly in a Z direction, an X-polarized light passes through the liquid crystal device two times and a Y-polarized light passes through the liquid crystal device one time.

11 Claims, 3 Drawing Sheets

(56) References Cited

OTHER PUBLICATIONS

Y. J. Wang et al., "Polarization aberrations of electrically tunable liquid crystal mirrors," Optics Express, 28(8), pp. 11356-11371, 2020.
Y. J. Wang et al., "Augmented reality with image registration, vision correction and sunlight readability via liquid crystal devices," Scientific Reports, 7:433, pp. 1-12, 2017.
T. Galstian and K. Allahverdyan, "Focusing unpolarized light with a single-nematic liquid crystal layer," Optical Engineering, 54(2), pp. 025104-1-025104-5, 2015.
Search Report appended to an Office Action, which was issued to Taiwanese counterpart Application No. 110124063 by the TIPO on Mar. 28, 2022 with an English translation thereof.

* cited by examiner

OPTICAL SYSTEM INCLUDING PANCAKE LENS ASSEMBLY

CROSS-REFERENCE TO RELATED APPLICATION

This application claims priority of Taiwanese Invention Patent Application No. 110124063, filed on Jun. 30, 2021.

FIELD

The disclosure relates to an optical system, and more particularly to an optical system including a pancake lens assembly by which the amount of optical phase modulation of a liquid crystal device of the pancake lens assembly may be increased.

BACKGROUND

A near-eye display (for example, a head-mounted display) for a virtual reality (VR) system, an augmented reality (AR) system, and so on, is used to create a virtual image in the field of view (FOV) for both eyes of a user. However, the near-eye display might cause symptoms such as visual fatigue, eyestrain, and so on, which are collectively referred to as vergence-accommodation conflict (VAC). In this case, the two eyes of the user might not verge and accommodate at the same time for estimating the relative distance of objects.

In addition, to give the user an improved FOV, a distance between the near-eye display and each of the eyes is normally kept at a limited range, for example, about 15 mm to 50 mm. However, the eyes of a user wearing eyeglasses might not be kept in the aforesaid distance range, which might adversely affect the FOV.

In addition, it is cumbersome if the eyeglasses are necessary to be provided between the user and the near-eye display for viewing images.

SUMMARY

Therefore, an object of the disclosure is to provide an optical system including a pancake lens assembly which may eliminate or alleviate at least one of the above-mentioned drawbacks.

According to the disclosure, an optical system includes a pancake lens assembly which has a lens unit and a liquid crystal device. The lens unit includes a partially reflective mirror, a reflective polarizer, and a quarter waveplate disposed between the partially reflective mirror and the reflective polarizer. The lens unit is configured such that when a light is introduced into the pancake lens assembly in a Z direction to form a continuous light path including three path segments between the quarter waveplate and the reflective polarizer, an X-polarized light polarized in an X direction orthogonal to the Z direction travels on two of the three path segments, and a Y-polarized light polarized in a Y direction orthogonal to both the X and Z directions travels on a remaining one of the three path segments. The liquid crystal device has liquid crystal molecules. Long axes of the liquid crystal molecules are orientated parallel to an X-Z plane defined by the X and Z directions, and the liquid crystal device is disposed between the quarter waveplate and the reflective polarizer such that when the continuous light path is formed, the X-polarized light passes through the liquid crystal device two times and the Y-polarized light passes through the liquid crystal device one time.

With the provision of the optical system of the disclosure, a folded light path (i.e., the continuous light path) can be formed in the optical system, which is conducive for reducing total volume of the optical system. In addition, by arranging the long axes of the liquid crystal molecules in parallel to the X-Z plane, the light passing through the pancake lens assembly can be adjusted by the liquid crystal device two times, which is beneficial for solving the problem of limited adjustable optical phase in a liquid crystal device. In addition, the optical system may be also used for mitigating the vergence-accommodation conflict (VAC) caused by the near-eye display, and/or for vision correction.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
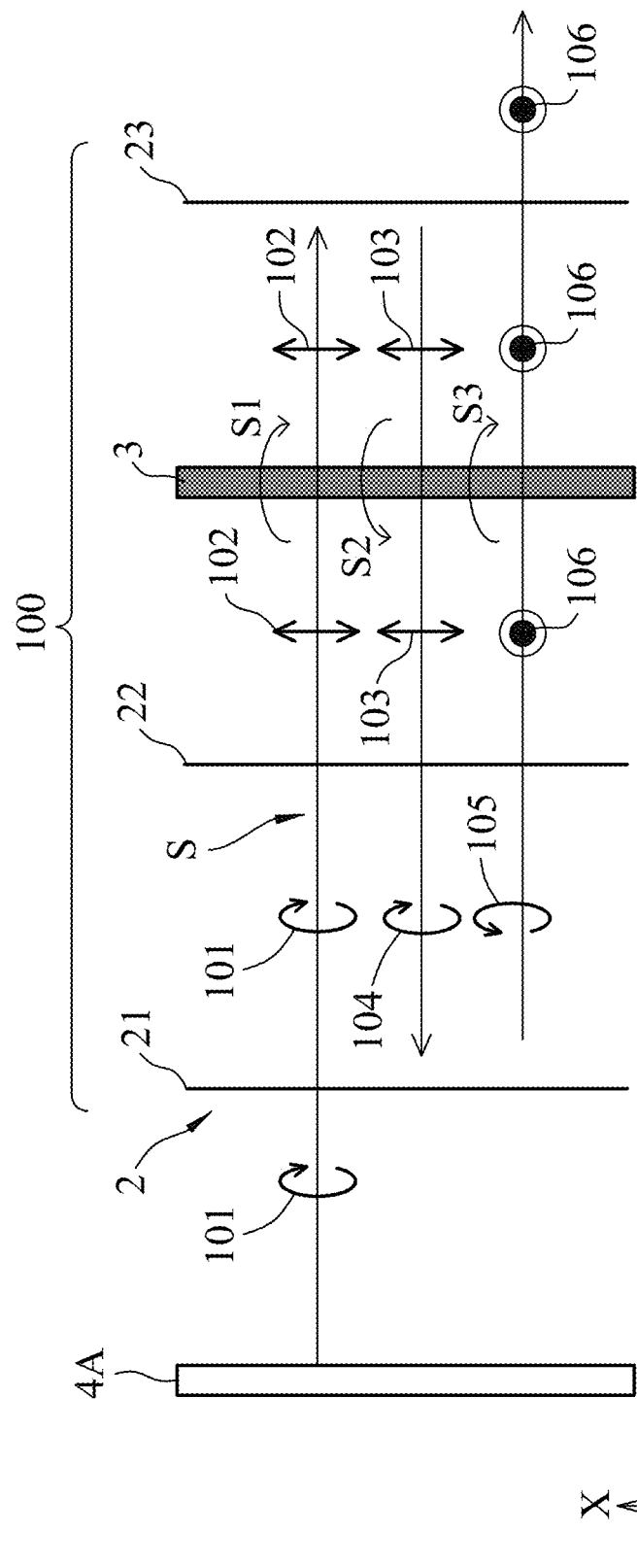
FIG. 1 is a schematic view illustrating a light path in an optical system in accordance with some embodiments of the disclosure.

Before the disclosure is described in greater detail, it should be noted that where considered appropriate, reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

It should be noted that the drawings, which are for illustrative purposes only, are not drawn to scale, and are not intended to represent the actual sizes or actual relative sizes of the components of the pancake lens assembly.

Referring to FIG. 1, an optical system in accordance with some embodiments of the disclosure is shown to include a pancake lens assembly 100, which includes a lens unit 2 and a liquid crystal device 3.

The lens unit 2 includes a partially reflective mirror 21, a reflective polarizer 23, and a quarter waveplate 22 disposed between the partially reflective mirror 21 and the reflective polarizer 23. The lens unit 2 is configured such that when a light is introduced into the pancake lens assembly 100 along an optical axis thereof in a Z direction to form a continuous light path (S) including three path segments (S1, S2, S3) between the quarter waveplate 22 and the reflective polarizer 23, an X-polarized light polarized in an X direction orthogonal to the Z direction travels on two of the three path segments (S1, S2, S3), and a Y-polarized light polarized in a Y direction orthogonal to both the X and Z directions travels on a remaining one of the three path segments (S1, S2, S3).

In some embodiments, the partially reflective mirror 21 may be a beam splitter, for example, a 50/50 mirror which reflects about 50% of a light beam incident thereon and transmits about 50% of the light beam. In some embodiments, the partially reflective mirror 21 is configured to partially transmit a first circularly polarized light and to partially reflect and transform the first circularly polarized light into a second circularly polarized light having a circular polarization direction different from that of the first circularly polarized light. In addition, the partially reflective mirror 21 is also configured to partially transmit the second circularly polarized light, and to partially reflect and transform the second circularly polarized light into the first circularly polarized light. In some embodiments, as shown in FIG. 1, the first circularly polarized light is a right circularly (R-circularly) polarized light represented by arrows 101, 104, and the second circularly polarized light is a left circularly (L-circularly) polarized light represented by an arrow 105.

In some embodiments, the quarter waveplate 22 is configured to transform the first circularly polarized light into a first linearly polarized light, to transform the first linearly polarized light into the first circularly polarized light, to transform the second circularly polarized light into a second linearly polarized light having a linear polarization direction different from that of the first linearly polarized light, and to transform the second linearly polarized light into the second circularly polarized light. In some embodiments, the polarization direction of the first linearly polarized light is different from that of the second linearly polarized light by about 90 degrees. In certain embodiments, as shown in FIG. 1, the first linearly polarized light is an X-polarized light represented by arrows 102, 103, and the second linearly polarized light is a Y-polarized light represented by an arrow 106.

In some embodiments, as shown in FIG. 1, the reflective polarizer 23 is configured to reflect the first linearly polarized light (for example, the X-polarized light represented by the arrow 102) and to transmit the second linearly polarized light (for example, the Y-polarized light represented by the arrow 106).

Figure 2:
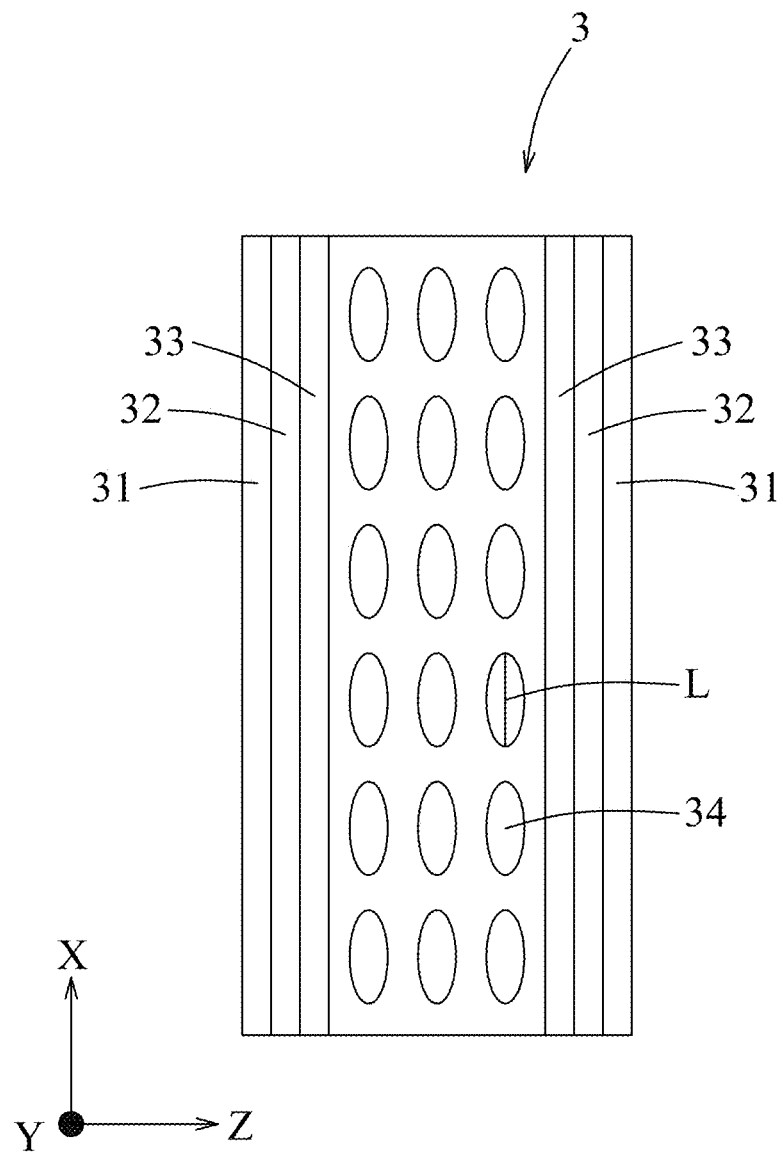
FIG. 2 is a schematic view illustrating details of a liquid crystal device of the optical system shown in FIG. 1.

As shown in FIGS. 1 and 2, the liquid crystal device 3 has liquid crystal molecules 34. Long axes (L) of the liquid crystal molecules 34 are orientated parallel to an X-Z plane defined by the X and Z directions, and the liquid crystal device 3 is disposed between the quarter waveplate 22 and the reflective polarizer 23 such that when the continuous light path (S) is formed, the X-polarized light represented by the arrows 102, 103 passes through the liquid crystal device 3 two times and the Y-polarized light represented by the arrow 106 passes through the liquid crystal device 3 one time.

In some embodiments, the liquid crystal device 3 is a transmissive liquid crystal device or other suitable devices. In some embodiments, the liquid crystal device 3 is selected from the group consisting of a liquid crystal lens with a fixed focus, an electrically tunable focusing liquid crystal lens, a liquid crystal grating, a liquid crystal prism, other suitable devices, and combinations thereof. In some embodiments, the liquid crystal device 3 may include two substrates 31 spaced apart from each other in the Z direction, two electrode layers 32 formed respectively on the substrates 31, two alignment layers 33 formed respectively on the electrode layers 32, and the liquid crystal molecules 34 filled in a space between the alignment layers 33 to permit all the long axes (L) of the liquid crystal molecules 34 to be orientated parallel to the X-Z plane. In the case that the liquid crystal device 3 is an electrically tunable focusing liquid crystal lens, orientations of the liquid crystal molecules 34 are varied by adjusting a voltage between the electrode layers 32, thereby adjusting an optical power of the liquid crystal device 3.

In some embodiments, as shown in FIG. 1, the optical system may further include a light-providing device 4A disposed to introduce the light into the pancake lens assembly 100 through the partially reflective mirror 21, so as to permit the light to be outputted from the pancake lens assembly 100 through the reflective polarizer 23. In some embodiments, the light-providing device 4A is configured to provide a circularly polarized light. In some embodiments, the light-providing device 4A may be a display or other suitable devices. The light-providing device 4A may be an OLED (organic light-emitting diode) display for providing a circularly polarized light. If the light-providing device 4A is an LED (light-emitting diode) display for providing a linearly polarized light, an additional quarter waveplate (not shown) may be used for transforming the linearly polarized light into a circularly polarized light.

The polarization transformation of the light in the optical system is described in detail below with reference to FIG. 1. An R-circularly polarized light represented by the arrow 101 from the light-providing device 4A passes through the partially reflective mirror 21, and then encounters the quarter waveplate 22. The quarter waveplate 22 transforms the R-circularly polarized light into an X-polarized light represented by the arrow 102. The X-polarized light traveling on the path segment (S1) passes through the liquid crystal device 3 for the first time, and is reflected by the reflective polarizer 23. Thereafter, the reflected X-polarized light represented by the arrow 103 traveling on the path segment (S2) passes through the liquid crystal device 3 for the second time. Afterward, the quarter waveplate 22 transforms the X-polarized light into an R-circularly polarized light represented by the arrow 104. The partially reflective mirror 21 reflects and transforms the R-circularly polarized light into an L-circularly polarized light represented by the arrow 105. Next, the quarter waveplate 22 transforms the L-circularly polarized light into a Y-polarized light represented by the arrow 106. The Y-polarized light traveling on the path segment (S3) passes through the liquid crystal device 3 for the third time, and then passes through the reflective polarizer 23 toward an eye of a user (not shown).

It should be noted that when a light passes through the liquid crystal device 3, the optical phase modulated by the liquid crystal device 3 is limited, which may be related to the thickness and refractive index of the materials used in liquid crystal device 3.

In this case, the liquid crystal device 3 is a polarization-dependent lens merely for adjusting the focus of the X-polarized light. In other words, the focus of the light can be adjusted by the liquid crystal device 3 two times. In alternative embodiment, the liquid crystal device 3 may be a polarization-independent lens for adjusting the focuses of the X-polarized light and the Y-polarized light.

By directing the light to pass through the liquid crystal device 3 several times, the optical phase modulated by the liquid crystal device 3 may be enhanced. Therefore, compared to a typical liquid crystal lens which has an increased thickness of a liquid crystal layer to achieve the same optical modulation range (i.e., the variation range of the optical power) as that of the pancake lens assembly 100, the response time of pancake lens assembly 100 is relatively fast compared to the typical liquid crystal lens with the increased thickness of the liquid crystal layer. Although two liquid crystal devices provided at two opposite sides of the lens unit 2 may also achieve the same effect, the number of such liquid crystal device is doubled. Besides, one liquid crystal device disposed outside of the lens unit 2 may not achieve the effect shown by the liquid crystal device 3 disposed in the lens unit 2.

Furthermore, a distance between the reflective polarizer 23 and the liquid crystal device 3 may affect the overall optical phase modulation, i.e., affect the equivalent diopter of the pancake lens assembly 100. For example, when the liquid crystal device 3 is a liquid crystal lens, a predetermined distance between the reflective polarizer 23 and the liquid crystal device 3 may be equal to a thickness of two of the liquid crystal lenses. When the distance between the reflective polarizer 23 and the liquid crystal device 3 is less than the predetermined distance, the equivalent diopter of the liquid crystal device 3 in the pancake lens assembly 100 can be doubled. On the contrary, when the distance between the reflective polarizer 23 and the liquid crystal device 3 is larger than the predetermined distance, the equivalent diopter of the liquid crystal device 3 in the pancake lens assembly 100 may be less than double. The actual equivalent diopter may be calculated based on the concept of a composite lens, and details thereof are omitted for the sake of brevity. When the liquid crystal device 3 is a liquid crystal prism, an effect observed with two liquid crystal prisms may be obtained. Therefore, by providing the liquid crystal device 3 in the lens unit 2, a relatively thin liquid crystal device 3 can be used to achieve a good performance, which is conductive for reducing total volume and weight of the pancake lens assembly 100.

In addition, although the elements 21, 22, 3, 23 are spaced apart from each other in FIG. 1, those elements may be bonded to each other along the optical axis of the pancake lens assembly 100 in the Z direction without gaps therebetween. For example, the quarter waveplate 22 and the partially reflective mirror 21 are sequentially adhered on one side of the liquid crystal device 3, and the reflective polarizer 23 may be adhered on the other side of the liquid crystal device 3. Since the elements 21, 22, 23 may have thicknesses in micro-scale, and they may formed on the liquid crystal device 3 through sputtering or other suitable techniques used for reducing total thickness and weight of the pancake lens assembly 100.

In some embodiments, the liquid crystal device 3 may have a planar surface. In alternative embodiments, the liquid crystal device 3 may have a spherical, aspherical, or free-form optical surface. The surface of the liquid crystal device 3 may be varied based on application of the optical system.

In addition, when an imaging position is to be changed using the conventional near-eye display, the distance between the lens unit and the display would be changed. When the liquid crystal device 3 in the pancake lens assembly 100 is an electrically tunable focusing liquid crystal lens, the focal length can be electrically controlled, and there is no need to move the lens unit 2 and the display (such as the light-providing device 4A). Therefore, when the pancake lens assembly 100 is applied to, for example, a near-eye display, the vergence-accommodation conflict (VAC) can be resolved, or vision correction of a user can be achieved. Therefore, a user with poor vision may use the near-eye display without wearing eyeglasses or the like for vision correction.

Furthermore, the optical system of the disclosure may also serve as at least a portion of a corrective lens for daily vision correction.

Figure 3:
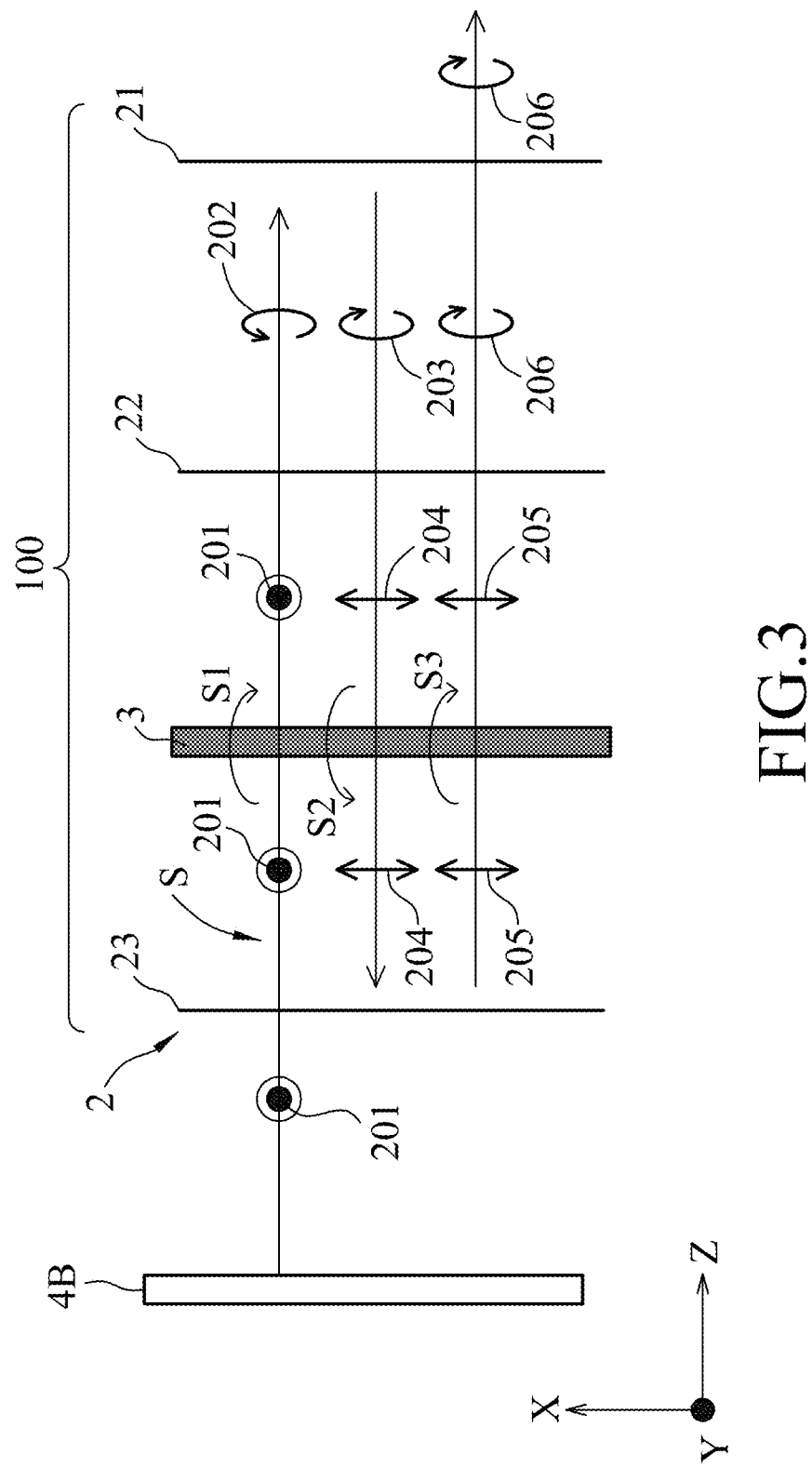
FIG. 3 is a schematic view illustrating another optical system in accordance with some embodiments of the disclosure.

FIG. 3 illustrates an optical system in accordance with some embodiments. The optical system shown in FIG. 3 is similar to that shown in FIG. 1, except that, in FIG. 3, a light-providing device 4B is disposed to introduce the light into the pancake lens assembly 100 through the reflective polarizer 23 so as to permit the light to be outputted from the pancake lens assembly 100 through the partially reflective mirror 21. In some embodiments, the light-providing device 4B is configured to provide a linearly polarized light. In some embodiments, the light-providing device 4B is a display or other suitable devices.

The polarization transformation of the light is described in detail below with reference to FIG. 3. A Y-polarized light represented by an arrow 201 from the light-providing device 4B passes through the reflective polarizer 23. Then, the Y-polarized light traveling on the path segment (S1) passes through the liquid crystal device 3 for the first time. The quarter waveplate 22 transforms the Y-polarized light into an L-circularly polarized light represented by an arrow 202. Thereafter, the partially reflective mirror 21 reflects and transforms the L-circularly polarized light into an R-circularly polarized light represented by an arrow 203. Next, the quarter waveplate 22 transforms the R-circularly polarized light into an X-polarized light represented by an arrow 204. The X-polarized light traveling on the path segment (S2) passes through the liquid crystal device 3 for the second time, and is then reflected by the reflective polarizer 23. The reflected X-polarized light represented by an arrow 205 traveling on the path segment (S3) passes through the liquid crystal device 3 for the third time. Then, the quarter waveplate 22 transforms the X-polarized light into an R-circularly polarized light represented by an arrow 206. Finally, the R-circularly polarized light passes through the partially reflective mirror 21 toward an eye of a user (not shown).

With the provision of the optical system of the disclosure, a folded light path (i.e., the continuous light path) can be formed in the optical system, which is conducive for reducing total volume of the optical system. In addition, by arranging the long axes (L) of the liquid crystal molecules 34 in parallel to the X-Z plane, the light passing through the pancake lens assembly 100 can be adjusted at least two times by the liquid crystal device 3, which solves the problem of limited adjustable optical phase in a liquid crystal device. In addition, the optical system of the disclosure may be also used for mitigating the VAC caused by the near-eye display, and/or for vision correction.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An optical system comprising a pancake lens assembly which includes:
    a lens unit including a partially reflective mirror, a reflective polarizer, and a quarter waveplate disposed between said partially reflective mirror and said reflective polarizer, said lens unit being configured such that when a light is introduced into said pancake lens assembly in a Z direction to form a continuous light path including three path segments between said quarter waveplate and said reflective polarizer, an X-polarized light polarized in an X direction orthogonal to the Z direction travels on two of the three path segments, and a Y-polarized light polarized in a Y direction orthogonal to both the X and Z directions travels on a remaining one of the three path segments; and
    a liquid crystal device having liquid crystal molecules, long axes of said liquid crystal molecules being orientated parallel to an X-Z plane defined by the X and Z directions, said liquid crystal device being disposed directly between said quarter waveplate and said reflective polarizer such that when the continuous light path is formed, the X-polarized light passes through said liquid crystal device two times and the Y-polarized light passes through said liquid crystal device one time,
    wherein said liquid crystal device is selected from the group consisting of a liquid crystal lens with a fixed focus, an electrically tunable focusing liquid crystal lens, a liquid crystal grating, a liquid crystal prism, and combinations thereof.

2. The optical system according to claim 1, wherein said liquid crystal device is a transmissive liquid crystal device.

3. The optical system according to claim 1, further comprising a light-providing device disposed to introduce the light into said pancake lens assembly through said partially reflective mirror so as to permit the light to be outputted from said pancake lens assembly through said reflective polarizer.

4. The optical system according to claim 3, wherein said light-providing device is configured to provide a circularly polarized light.

5. The optical system according to claim 1, further comprising a light-providing device disposed to introduce the light into said pancake lens assembly through said reflective polarizer so as to permit the light to be outputted from said pancake lens assembly through said partially reflective mirror.

6. The optical system according to claim 5, wherein said light-providing device is configured to provide a linearly polarized light.

7. The optical system according to claim 1, wherein said partially reflective mirror is configured to partially first circularly polarized light and to partially reflect and transform the first circularly polarized light into a second circularly polarized light having a circular polarization direction different from that of the first circularly polarized light, and to partially transmit the second circularly polarized light, and to partially reflect and transform the second circularly polarized light into the first circularly polarized light.

8. The optical system according to claim 7, wherein said quarter waveplate is configured to transform the first circularly polarized light into a first linearly polarized light,
    to transform the first linearly polarized light into the first circularly polarized light,
    to transform the second circularly polarized light into a second linearly polarized light having a linear polarization direction different from that of the first linearly polarized light, and
    to transform the second linearly polarized light into the second circularly polarized light.

9. The optical system according to claim 8, wherein said reflective polarizer is configured to reflect the first linearly polarized light and to transmit the second linearly polarized light.

10. The optical system according to claim 9, wherein
    the first circularly polarized light is a right circularly polarized light,
    the second circularly polarized light is a left circularly polarized light,
    the first linearly polarized light is the X-polarized light, and
    the second linearly polarized light is the Y-polarized light.

11. An optical system comprising a pancake lens assembly which includes:
    a lens unit including a partially reflective mirror, a reflective polarizer, and a quarter waveplate disposed between said partially reflective mirror and said reflective polarizer, said lens unit being configured such that when a light is introduced into said pancake lens assembly in a Z direction to form a continuous light path including three path segments between said quarter waveplate and said reflective polarizer, an X-polarized light polarized in an X direction orthogonal to the Z direction travels on two of the three path segments, and a Y-polarized light polarized in a Y direction orthogonal to both the X and Z directions travels on a remaining one of the three path segments; and
    a liquid crystal device having liquid crystal molecules, long axes of said liquid crystal molecules being orientated parallel to an X-Z plane defined by the X and Z directions, said liquid crystal device being disposed directly between said quarter waveplate and said reflective polarizer such that when the continuous light path is formed, the X-polarized light passes through said liquid crystal device two times and the Y-polarized light passes through said liquid crystal device one time,
    wherein said liquid crystal device is capable of controlling a focal length and is selected from the group consisting of an electrically tunable focusing liquid crystal lens, a liquid crystal grating, a liquid crystal prism, and combinations thereof.

* * * * *